UNITED STATES PATENT OFFICE.

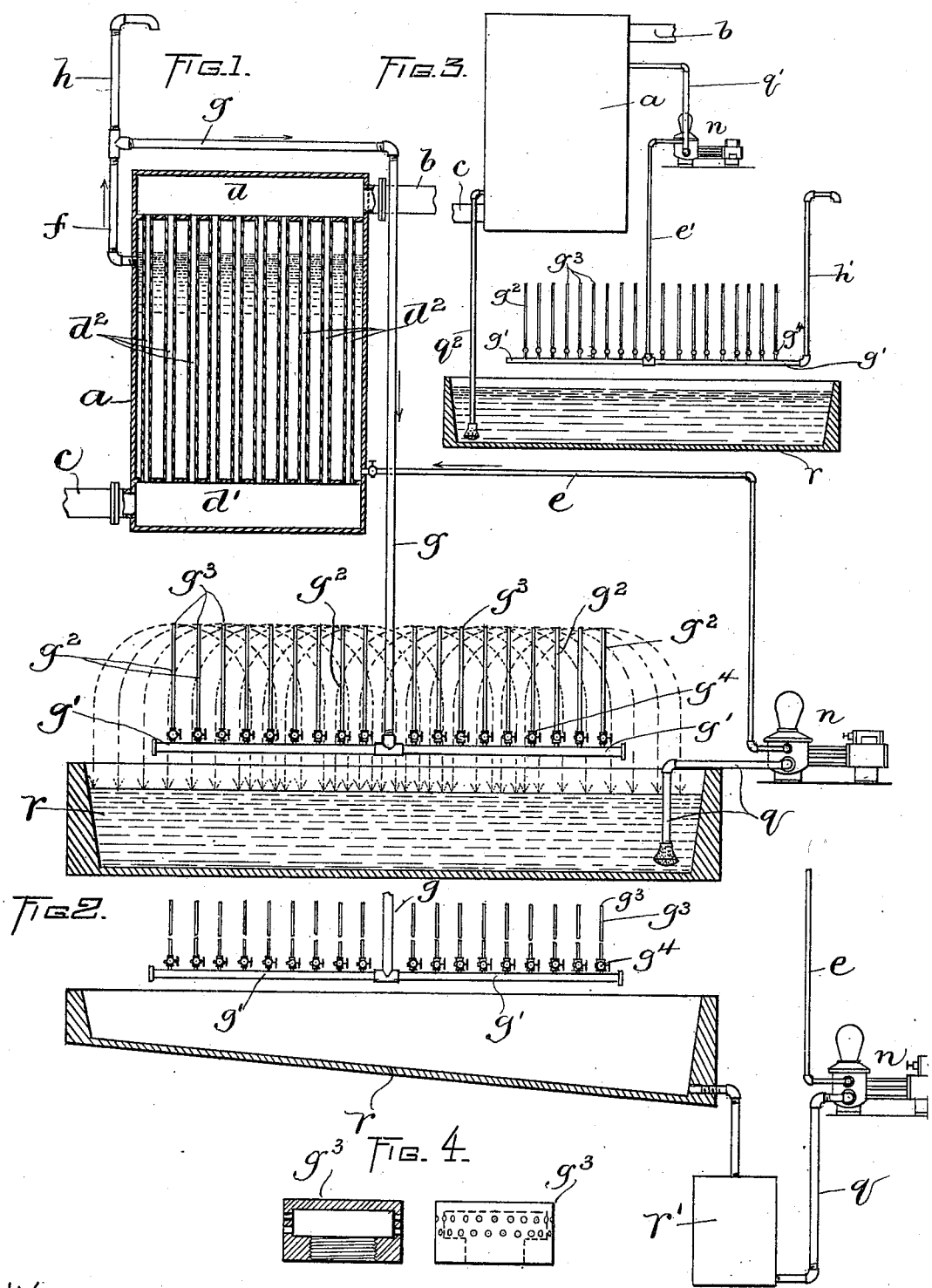

WILLIAM E. McKAY, OF BOSTON, MASSACHUSETTS.

LIQUID-COOLING APPARATUS.

SPECIFICATION forming part of Letters Patent No. 644,364, dated February 27, 1900.

Application filed March 3, 1899. Serial No. 707,602. (No model.)

*To all whom it may concern:*

Be it known that I, WILLIAM E. MCKAY, of Boston, in the county of Suffolk and State of Massachusetts, have invented certain new and useful Improvements in Liquid-Cooling Apparatus, of which the following is a specification.

This invention has for its object to enable water or other liquid used for cooling purposes to be economically cooled, so that it may be repeatedly used in the same apparatus, to the end that the expense attending the use of water in large quantities for cooling purposes may be reduced to the minimum.

The invention consists in the improved apparatus which I will now proceed to describe and claim.

Of the accompanying drawings, forming a part of this specification, Figure 1 represents a diagrammatic view, partly in elevation and partly in section, of an apparatus embodying my invention. Figs. 2 and 3 represent modifications. Fig. 4 represents in separate views a section and side elevation of the preferred form of sprinkling-nozzle.

In the embodiment of my invention here shown for purposes of illustration I show a condenser for gas, vapor, or steam which comprises two receiving-chambers $d\ d'$, connected by a series of corresponding pipes $d^2$. Gas, vapor, or steam enters the chamber $d$ through an inlet-pipe $b$ and leaves the chamber $d'$ through an outlet-pipe $c$. The pipes $d^2$ are surrounded by a casing $a$, adapted to confine a body of water surrounding said pipes and exerting a cooling influence upon the pipes and upon the inner surfaces of the chambers $d\ d'$. The casing $a$ receives water through a pipe $e$ and discharges water through a pipe $f$.

$g$ represents a conduit which receives water from the pipe $f$ and has provisions for subdividing the water and delivering it in numerous attenuated streams or in the form of spray into the atmosphere above a collecting-basin $r$, which is located below the conduit $g$ and is open to the atmosphere. The preferred provisions for distributing the water passing through the conduit $g$ are horizontal branches $g'\ g'$, communicating with the lower portion of the main conduit $g$, and a series of vertical pipes $g^2$, rising from the branches $g'\ g'$ and having water distributing or spraying nozzles $g^3$ at their upper ends formed to discharge the water laterally in numerous fine streams. The pipes $g^2$ are preferably provided with valves $g^4$, whereby the quantity of liquid flowing through each pipe may be regulated or whereby any of the pipes may be shut off from the conduit $g$. The nozzles $g^3$ are preferably formed to deliver the fine streams of water horizontally, to effectually disseminate the streams and prevent their consolidation, said streams falling into the collecting-basin $r$, the height of the nozzles $g^3$ above the basin being such as to give the streams a considerable fall, so that they are effectually cooled by contact with the air between the nozzles and the basin.

$n$ represents a pump having a suction-pipe $q$ communicating with the basin and having for its discharge-pipe the pipe $e$, above referred to. When the pump is in operation, it draws the cool water from the basin $r$ and forces it into the water-space of the condenser, the water circulating through the condenser and emerging through the pipes $f\ f$ into the conduit $g$, through which it flows back to the basin, as above described.

$h$ represents a riser or head-pipe on the discharge of the pump, said pipe being shown in Fig. 1 as forming a continuation of the conduit $g$ and projecting above the same, its upper end being open to the atmosphere. This head-pipe permits a fluctuation of the head of water in the conduit $g$ and regulates and makes uniform the pressure in the liquid-conducting portions of the condenser.

The valves $g^4$ in the distributing-pipes $g^2$ enable the pipes adjacent to the lee side of the reservoir to be closed in case the currents of air flowing across the reservoir are sufficiently strong to drive portions of the water out of the space over the reservoir.

It is obvious that suitable means may be employed for forcing air-currents across the reservoir in contact with the streams or spray distributed by the pipes $g^2$.

My invention is not confined to use in connection with gas-condensers, as it may be used with condensers for exhaust-steam or with any form of apparatus adapted to be cooled by the circulation of a liquid.

The collecting-basin $r$ may be of limited capacity and connected with a storage basin or reservoir $r'$, located at a distance from the basin, as shown in Fig. 2, the suction-pipe $q$ of the pump being arranged to draw water from said reservoir $r'$.

If desired, the pump may draw water directly from the casing $a$ and force it through the distributing-pipes $g^2$, as shown in Fig. 3, the suction-pipe $q'$ of the pump communicating with the casing $a$ and the discharge-pipe $e'$ with the distributing-pipes $g^2$. In this modification the casing $a$ is connected with the collecting basin or reservoir by a pipe $q^2$ to permit the pump to draw water from said basin via the casing $a$. The head-pipe $h'$ in this modification is also connected with the discharge of the pump and is shown as connected with the pipe $g'$ and projecting upwardly therefrom above the upper ends of the distributing-pipe $g^2$, its upper end being open to the atmosphere.

I am aware that it has been proposed to cool water by forcing it up into the atmosphere in the state of spray or fine division and permitting it to fall into a vessel below, the apparatus for such use depending for its efficiency upon the fact that the water is in contact with the air both in rising and in falling. In such an apparatus, however, it is impossible to vary the pressure without varying the height to which the water is thrown, while with my apparatus the water is conducted in closed pipes to the point of discharge, which is the highest point to which it is forced and from whence it issues in a series of streams in a practically-horizontal direction.

When the water is thrown upward, as by the former apparatus above referred to, it is liable to consolidate by the collision of the rising and falling drops, while with my apparatus there can be no rising particles of water to conflict with those that are falling, as my apparatus discharges the water only in a direction that is horizontal, or substantially so, and the action of gravity then simply causes the water to gradually curve or fall from the horizontal direction of discharge from the nozzles.

As is well known, when water is forced upward, as above described, it turns and falls in such manner that the components of the jet will either fall in a central solid mass or in separate drops, which will thus result in an insufficient cooling of the solid mass or in too great an evaporation from the separated particles or drops. With my apparatus, owing to the streams being discharged in a horizontal direction, there is no conflict of rising and falling water, and the water therefore issues from the nozzles in small streams, which remain practically unbroken until they reach the surface of the water in the basin. I am therefore enabled to obtain the greatest amount of cooling effect by radiation, while losing a minimum amount of water by evaporation. Furthermore, owing to the vertical pipes $g^2$ being small there is considerable cooling effect obtained while the water is rising in said pipes and before it is discharged from the nozzles.

Having thus explained the nature of my said invention and described a way of constructing and using the same, although without having attempted to set forth all the forms in which it may be embodied or all the modes of its use, I declare that what I claim is—

1. An apparatus of the character specified, comprising a cooling device having suitable passages for gas, vapor or steam, said passages being surrounded by spaces for liquid, a collecting-basin open to the atmosphere, a conduit arranged to transfer the heated liquid from the said liquid-space to the collecting-basin, said conduit including a plurality of small vertical discharge-pipes located over different portions of the collecting-basin, each pipe having a valve or cock and having a spraying or distributing nozzle adapted to discharge small unbroken streams of liquid in a substantially-horizontal direction, and means for returning the cooled liquid from said collecting-basin to the liquid-space in said cooling device.

2. The combination with a condenser comprising two receiving-chambers $d$ $d'$ connected by a series of corresponding pipes $d^2$, connections with said chambers for gas, vapor or steam, a casing surrounding said pipes $d^2$, a collecting-basin open to the atmosphere and located below the condenser, a conduit connected at its upper end with the casing of the condenser and having horizontal branches $g$ $g'$ extending over the collecting-basin and provided with a series of small vertical pipes $g^2$ having valves or cocks and provided with horizontal-spraying nozzles at their upper ends adapted to discharge small unbroken streams of liquid, and means for returning liquid from the collecting-basin to the space within the casing of the condenser.

In testimony whereof I have affixed my signature in presence of two witnesses.

WILLIAM E. McKAY.

Witnesses:
C. F. BROWN,
A. D. HARRISON.